United States Patent [19]

Plovanich et al.

[11] Patent Number: 4,752,316
[45] Date of Patent: Jun. 21, 1988

[54] APPARATUS AND PROCESSES FOR COMPRESSING AND/OR BIODIGESTING MATERIAL

[75] Inventors: Charles J. Plovanich, Westernville; Guy H. Ossont; Keith C. King, both of Rome; Robert H. Irwin, Lafayette, all of N.Y.; Walter V. Knopp, Columbus, N.C.

[73] Assignee: Revere Copper and Brass Incorporated, Rome, N.Y.

[21] Appl. No.: 864,320

[22] Filed: May 19, 1986

Related U.S. Application Data

[62] Division of Ser. No. 792,026, Oct. 28, 1985, Pat. No. 4,683,814.

[51] Int. Cl.$^4$ ................................................ C05F 9/04
[52] U.S. Cl. ................................................ 71/9; 71/11; 71/23; 71/64.04; 71/903
[58] Field of Search ................ 71/9, 10, 11, 23, 64.04, 71/903; 100/121; 162/56; 44/2, 4, 12; 426/807

[56] References Cited

U.S. PATENT DOCUMENTS

| | | | |
|---|---|---|---|
| 3,853,480 | 12/1974 | Kaelin ................................... | 71/9 X |
| 4,032,318 | 6/1977 | Lovness ................................. | 71/9 |
| 4,119,741 | 10/1978 | Stahler ............................. | 426/807 X |
| 4,201,128 | 5/1980 | Whitehead et al. ................ | 71/21 X |
| 4,436,028 | 3/1984 | Wilder ................................... | 100/121 |

OTHER PUBLICATIONS

Jones, Keith C. Publication "Roll Crushing of Wood," presented at 1982 Forest Products Research Development Forum, Wash., D.C.

Primary Examiner—Ferris H. Lander
Attorney, Agent, or Firm—R. Gale Rhodes, Jr.

[57] ABSTRACT

Apparatus and process for compressing moisture containing material including a pair of opposed rolls for receiving and advancing the material therebetween to apply rolling load thereto to compress the material and remove at least a portion of said moisture therefrom, and differential means for causing one of said rolls to rotate at a lower speed than the rolling speed of the other of the rolls, the differential rolling speeds developing friction between the rolls causing the rolls to be heated and apply heat to said material to further remove moisture therefrom, to cause the compressed material to adhere to the one roll and to cause the removed moisture to adhere to the other roll, also alone and in combination, apparatus and process of decomposing organic material such as animal biomass by the action of aerobic microorganisms in the presence of oxygen, including introducing the organic material into a container having an end adapted to receive the organic material and an output end adapted to discharge the organic material, introducing a medium containing oxygen into the container to facilitate decomposition of the organic material by action of said microorganisms, and advancing the organic material through the container and upon decomposition of the organic material discharging the decomposed organic material out the output end of the container.

8 Claims, 5 Drawing Sheets

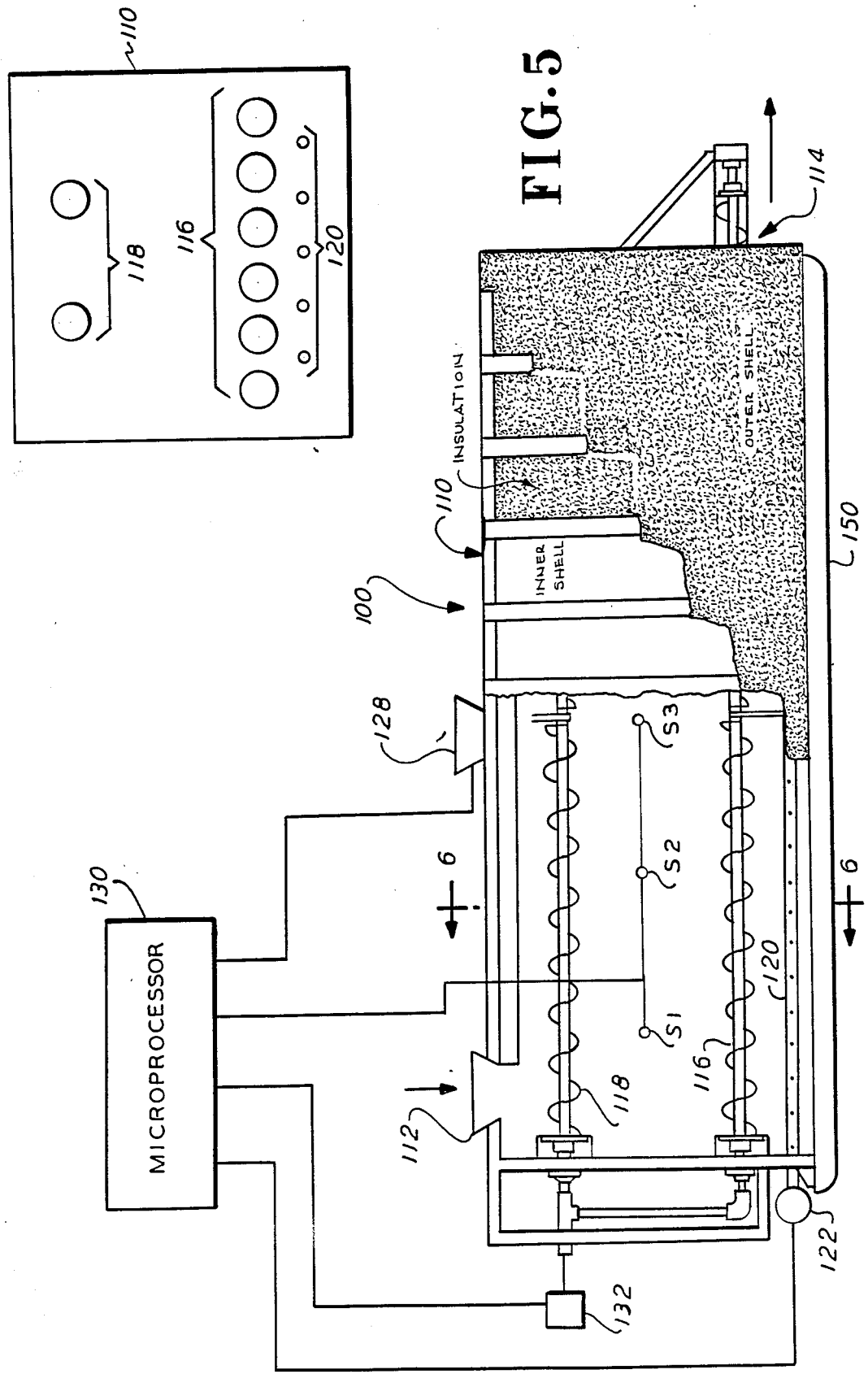

APPARATUS AND PROCESSES FOR COMPRESSING AND/OR BIODIGESTING MATERIAL

This is a division of application Ser. No. 792,026, filed Oct. 28, 1985, now U.S. Pat. No. 4,683,814, issued Aug. 4, 1987.

BACKGROUND OF THE INVENTION

This invention relates generally to apparatus and processes for compressing moisture containing material and more particularly to apparatus and processes for reducing the moisture content of moisture containing material such as wood or woody biomass, e.g. wood chips or green wood chips, pulp chips, hogged wood, sawdust, woodflour, wood bark, wood fiber pulp, lignin, and the like; vegetable/fruit biomass, e.g. cornstalks, peat, and the like; animal/fowl biomass, e.g. manure and the like; paper mill sludge; industrial mill sludge; municipal sewage sludge; coal slurry and the like; and for enhancing the production of ethanol and methanol.

As is known to those skilled in the moisture removal or reduction art, the removal or reduction of moisture from the foregoing examples is done for a variety of purposes. For example, moisture is removed from wood or woody biomass to convert the biomass to fuel, to enhance a pulping or paper making process, to produce fertilizer from animal/fowl biomass, and to reduce the moisture content of certain wood biomass, such as wood bark or other residue from a pulping or paper making process, prior to the typical burning of such residue for riddance as such residue is known to unwantedly rapidly accumulate in large quantities.

Due to the constant dwindling of the world's known oil reserves, it is highly desirable to be able to use wood, vegetable/fruit and animal/fowl biomasses as substitutes for oil and as an energy saving fuel source, such as boiler fuel. This is due primarily to their cheapness of cost and plentiful availability. However, as is known to those skilled in the art, and with regard to wood biomass as an example, the primary deterrent to the use of wood chips or green wood chips and the like for an energy saving fuel source, such as a boiler fuel, is the naturally high moisture content of the wood chips. Generally, the moisture content is so high that the wood chips cannot be burned efficiently as boiler fuel but first must be pre-dried. Such pre-drying unwantedly consumes energy and in most instances the amount of energy consumed in pre-drying virtually renders the use of wood chips as a fuel saving energy source a self-contradiction.

By way of further example, the two basic methods known for reducing moisture in wood biomass, e.g. wood chips for fuel such as boiler fuel, are: (i) heat energy to vaporize the moisture, (ii) mechanical energy to squeeze the moisture out. A variety of mechanical apparatus and methods of dewatering of wood chips, pulping rejects and bark are known to the art such as bark presses, roll presses, jaw presses and screw presses. These apparatus have not been highly successful in removing or reducing the moisture content of wood chips, particularly the bound water, i.e. the water held by physical/chemical bonding within the cell wall or cellular structure of wood biomass. It has been stated by John G. Haygreen, in his article entitled, "Potential for Compression Drying of Green Wood Chip Fuel," FOREST PRODUCTS JOURNAL, Vol. 31, No. 8, August 1981, "It should not be expected to lower the moisture content of wood below 30% by mechanical means." As is further known to those skilled in the art, the use of wood chips as an economically feasible source of boiler fuel generally requires that the moisture content of the wood chips be reduced below 30%.

Accordingly, there exists a great need in the art for apparatus and processes for reducing the moisture content of moisture containing materials such as the above-noted wood, vegetable and animal biomasses below that which may be achieved by presently known methods and apparatus for moisture removal or reduction, and a great need in the art for apparatus and process for enhancing the production of ethanol and methanol.

Further, this invention relates generally to apparatus and processes for biodigesting, decomposing, or composting organic material, such as for example animal biomass, e.g. manure, cow manure, and the like. As is known to those skilled in the art, animal biomass, such as cow manure and the like, decomposes naturally and it is advantageous to facilitate or accelerate such decomposition for use as organic fertilizer or soil conditioner. While many biodigesting, composting, or decomposing apparatus and processes are known to the art, because all such prior art apparatus and processes have various deficiencies of operation or attendant unwanted expensiveness of operation, they have been found to be not as useful as the processes and apparatus of the present invention for biodigestion. Accordingly, there is a need in the art for improved processes and apparatus for the biodigestion, decomposition, or composting of organic materials such as animal biomass, e.g. cow manure and the like, and further, if desired or required, for apparatus and process for reducing the moisture content of such decomposed or composted organic material, e.g. cow manure and the like, to further enhance its use as an organic fertilizer or organic soil conditioner or to further enhance its ease of transportation and use through reduced moisture content.

SUMMARY OF THE INVENTION

Moisture is removed from the above-noted moisture containing materials by advancing the material between opposed rolls operating at different speeds to compress the material and remove moisture therefrom, and to cause friction to develop between the rolls causing the rolls to be heated and apply heat to the compressed material to remove additional moisture therefrom, to cause the moisture to adhere to the roll rotating at the higher rate and to cause the compressed material to adhere to the roll rotating at the slower rate. The rolling load may be sufficiently great to also provide shearing action to material having cellular structure to rupture such cellular structure and remove bound moisture contained therein. The moisture may be wiped from the higher rotating roll for collection and the compressed material may be wiped from the slower rotating roll for collection and use as taught herein.

Prior to the removal of moisture from the above-noted moisture containing materials, such materials, particularly upon such materials being organic matter such as animal biomass, e.g. manure, may be biodigested or composted to decompose the material into, for example in the case of animal biomass, e.g. manure, into organic fertilizer or soil conditioner. Subsequently, if desired or required, such decomposed material may have moisture contained therein removed by the present invention as summarized above.

DESCRIPTION OF THE DRAWINGS

FIG. 5 is a diagrammatical illustration of a biodigester embodying the present invention;

FIG. 6 is a cross-sectional view taken generally along the line 6—6 in FIG. 7 and in the direction of the arrows;

DESCRIPTION OF THE PREFERRED EMBODIMENT

Figure 1:
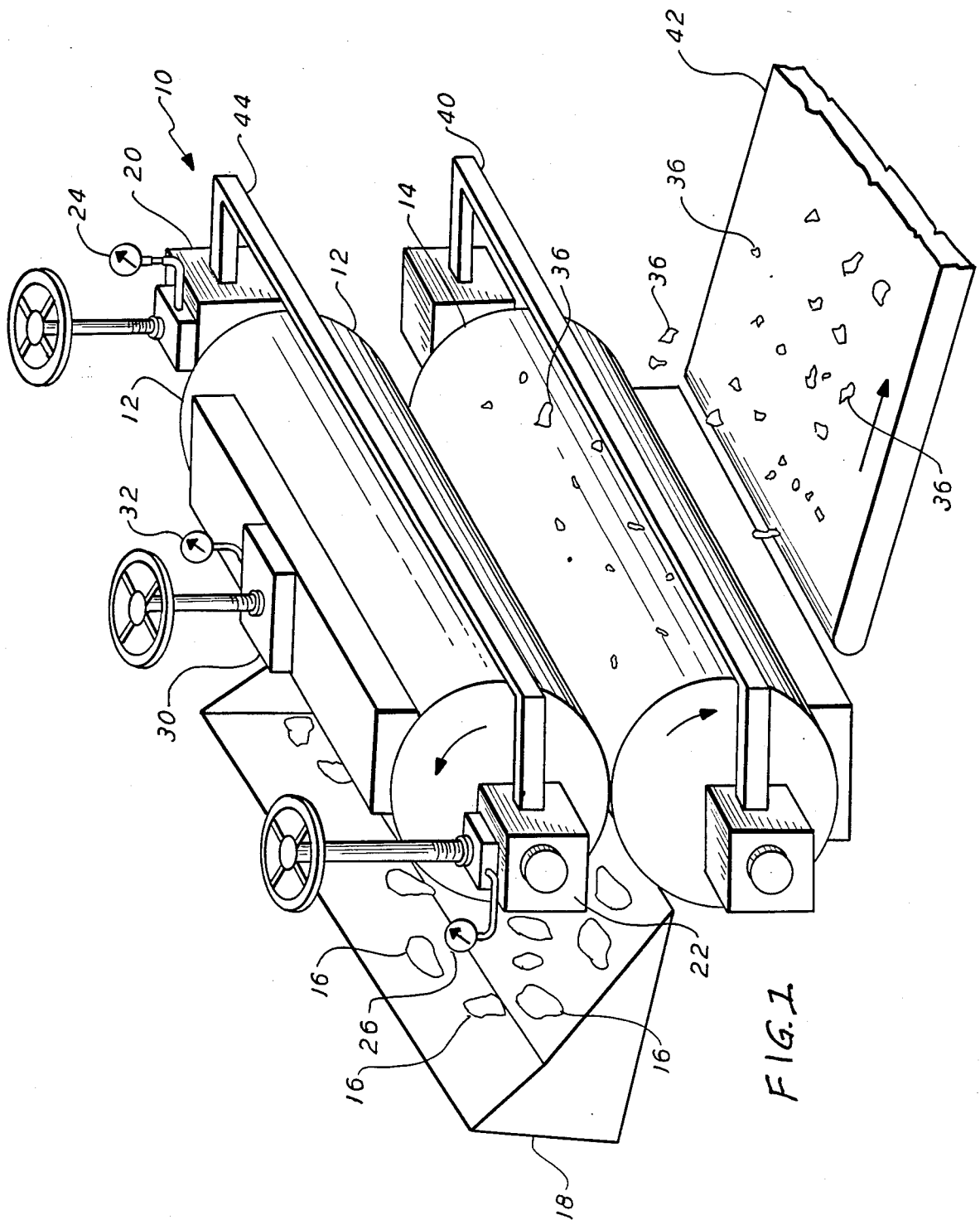
FIG. 1 is a diagrammatical illustration of rolling apparatus embodying the present invention and useful for practicing the process of the present invention.

Referring now to FIG. 1, there is illustrated diagrammatically apparatus embodying the present invention and indicated by general numerical designation 10. The apparatus includes a pair of opposed rolls 12 and 14 for advancing moisture containing material therebetween, such as for example the wood chips illustrated diagrammatically by reference numerals 16, to compress the material and remove at least a portion of the moisture therefrom; the wood chips 16 may be fed from a suitable hopper 18 which may be any one of several known to those skilled in the art. The rolls 12 and 14 may be rolls of any one of several rolling mills known to the art and their proper selection will become apparent from an understanding of the teachings of the present invention.

The rolls 12 and 14 may be provided with suitable screw-down mechanisms 20 and 22 which may be any one of several known to the art for advancing the upper roll 12 into a predetermined position with respect to the lower roll 14 to provide a predetermined gap between the rolls to predetermined rolling loads to moisture containing material passing therebetween. It will be understood that the expression "rolling loads" is defined in this application and the appended claims as the total pounds or force required to maintain the gap between the rolls through which the moisture containing material passes. The pressures applied to the upper roll 12 are indicated, respectively, by the pressure gauges 24 and 26, respectively. In one embodiment of apparatus of the present invention, an additional screw-down mechanism was included, such as additional screw-down mechanism 30 shown in FIG. 1. The pressure applied by the additional screw-down mechanism 30 is indicated by pressure gauge 32. It will be understood that the screw-down mechanism may be operated to provide different predetermined gaps between the rolls 12 and 14 to apply different rolling loads to the moisture containing material passing therebetween.

The apparatus 10 of the present invention further includes differential means for causing one of the rolls to rotate at a lower speed than the speed of rotation of the other roll, and such differential means may include any one of several such means known to those skilled in the art. For example, such differential speeds may be accomplished by providing the rolls 12 and 14 with independent drives or by driving the rolls with a common drive but by providing gearing whereby different speeds of rotation are imparted to the rolls. In one embodiment of the apparatus of the present invention, differential speed was provided by making the roll 14 of a smaller diameter than the diameter of the upper roll 12 whereby upon such rolls being driven from a common source at a common speed, differential speeds were achieved.

Upon the wood chips 16 passing between the rolls 12 and 14, they are compressed as taught above to remove at least a portion of the moisture therefrom and the particles are reduced in size as indicated by the particles given numerical designations 36. It has been discovered in accordance with the teachings of the present invention that upon the rolls 12 and 14 operating at differential speeds, the compressed material will adhere to the roll operating at the higher speed, roll 14 of FIG. 1, and that the removed moisture will adhere to the roll operating at the slower speed, roll 14 of FIG. 1. To remove the compressed particles 36, a wiper 40 may be mounted on the lower roll 14 as illustrated diagrammatically to wipe the compressed material from the roll 14 causing the compressed material 36 to fall into the bin 42. Similarly, a wiper 44 illustrated diagrammatically may be suitably mounted to the upper roll 12 to wipe the moisture therefrom for collection in a suitable container, not shown for clarity of drawing presentation. It has been further found, in accordance with the teachings of the present invention, that the differential speeds of the rollers 12 and 14 will develop friction therebetween which causes the rolls to be heated and apply heat to the moisture containing material as it is advanced through the rolls to further remove moisture therefrom by vaporization.

In one embodiment of the present invention, similar to that illustrated diagrammatically in FIG. 1, the upper roll 12 had a diameter of 6.25 inches, the lower roll 14 had a diameter of 5.75 inches, and the rolls had an effective face width of 10 inches; in such embodiment, the rolls were driven from a common source but the diameter differential gave the upper roll 12 a peripheral speed of 114 feet per minute and the lower roll 14 a peripheral speed of 105 feet per minute. Using such invention embodiment, various moisture containing materials were passed through the rolls with moisture reductions and rolling loads as indicated in the TABLES I, II and III below where column "A" represents initial moisture content and column "B" represents moisture content of the mixture after one pass through the rolls; the temperatures developed in the rolls are also indicated. It will be understood that the rolling loads in the following tables were computed by dividing the capacity of the hydraulic cylinders (in tons) providing the pressures read by the left pressure gauge 26, center pressure gauge 30, and the right pressure gauge 24 by the internal pressure at capacity ($\#/in^2$) to give the hydraulic cylinder effective area ($in^2$) and by multiplying the hydraulic cylinder pressure gauges (#/in$^2$) and by summing the same.

TABLE I

WOOD CHIPS (SOFT MAPLE CHIPS)

| A | B | Left | Center | Right | Rolling Load |
|---|---|---|---|---|---|
| 37% | 13% | 5000#/in$^2$ | 800#/in$^2$ | 5000#/in$^2$ | 70,114# |
| | | Rolls Temperature - 300° F. | | | |
| 37% | 10% | 2300#/in$^2$ | 800#/in$^2$ | 2300#/in$^2$ | 35,058# |
| | | Rolls Temperature - 300° F. | | | |
| 37% | 06% | 3500#/in$^2$ | 900#/in$^2$ | 3500#/in$^2$ | 51,287# |
| | | Rolls Temperature - 350° F. | | | |
| 36% | 15% | 3000#/in$^2$ | 300#/in$^2$ | 2000#/in$^2$ | 34,407# |
| | | Rolls Temperature - 70° F. | | | |
| 36% | 15% | 3000#/in$^2$ | 600#/in$^2$ | 3000#/in$^2$ | 42,847# |
| | | Rolls Temperature - 70° F. | | | |
| 36% | 14% | 4000#/in$^2$ | 1000#/in$^2$ | 4000#/in$^2$ | 58,428# |
| | | Rolls Temperature - 300° F. | | | |

TABLE II

VEGETABLE BIOMASS (PEAT)-MIXTURE 50% PEAT AND 50% SOFT MAPLE WOOD CHIPS

| A | B | Left | Center | Right | Rolling Load |
|---|---|---|---|---|---|
| 56% | 30% | 2500#/in$^2$ | 1000#/in$^2$ | 2500#/in$^2$ | 38,952# |
| | | Bottom Roll Temperature - 430° F. | | | |
| | | Top Roll Temperature - 405° F. | | | |

TABLE III

ANIMAL BIOMASS (COW MANURE) - MIXTURE OF 50% ANIMAL BIOMASS AND 50% SOFT MAPLE WOOD CHIPS

| A | B | Left | Center | Right | Rolling Load |
|---|---|---|---|---|---|
| 72% | 30% | 2100#/in$^2$ | 900#/in$^2$ | 2100#/in$^2$ | 27,324# |
| | | Rolls Temperature - 400° F. | | | |

In the following TABLES IV and V where column "A" represents initial moisture content and column "B" represents moisture content of the mixture after one pass through the rolls, no center screwdown mechanism was used; accordingly, only left and right pressure gauges were used.

TABLE IV

HARD WOOD CHIPS (HARD MAPLE, BLACK CHERRY MIXED)

| A | B | Left/psi | Right/psi | Rolling Load/# |
|---|---|---|---|---|
| 43% | 27% | 5,000–7,000 | 5,000–7,000 | 96,210–134,694 |
| | 306° F. top roll/ | | | |
| | 199° F. bottom roll | | | |
| 42% | 7% | 5,000–7,000 | 5,000–7,000 | 96,210–134,694 |
| | 421° F. top roll/ | | | |
| | 233° F. bottom roll | | | |
| 32% | 17% | 5,000–7,000 | 5,000–7,000 | 96,210–134,694 |
| | 290° F. top roll/ | | | |
| | 230° F. bottom roll | | | |
| 32% | 18% | 5,000–7,000 | 5,000–7,000 | 96,210–134,694 |
| | 221° F. top roll/ | | | |
| | 208° F. bottom roll | | | |

TABLE V

WASTE WOOD (BRANCHWOOD CHIPS)

| A | B | Left/psi | Right/psi | Rolling Load/# |
|---|---|---|---|---|
| 47% | 30% | 5,000–7,000 | 5,000–7,000 | 96,210–134,694 |
| | 280° F. top roll/ | | | |
| | 198° F. bottom roll | | | |
| 43% | 27% | 5,000–7,000 | 5,000–7,000 | 96,210– |

TABLE V-continued

WASTE WOOD (BRANCHWOOD CHIPS)

| A | B | Left/psi | Right/psi | Rolling Load/# |
|---|---|---|---|---|
| | 306° F. top roll/ | | | 134,694 |
| | 199° F. bottom roll | | | |
| 33% | 17% | 5,000–7,000 | 5,000–7,000 | 96,210–134,694 |
| | 290° F. top roll/ | | | |
| | 230° F. bottom roll | | | |
| 42% | 26% | 5,000–7,000 | 5,000–7,000 | 96,210–134,694 |
| | 260° F. top roll/ | | | |
| | 195° F. bottom roll | | | |

The percentage by weight of moisture removed from moisture containing material in accordance with the present invention was determined in the following manner: a first quantity of sample of such material, such as soft maple wood chips, was weighed, oven dried, weighed again and the two weights compared to determine the initial moisture content of the first sample on a percentage by weight basis. Then, a second sample of the material was passed through the apparatus of the present invention and moisture removed in accordance with the process of the present invention whereafter the second sample was weighed, oven dried, weighed again and the two weights compared to determine the moisture content of the second sample on a percentage by weight basis after one pass through the rolls. Then, the two moisture contents or percentages by weight were compared to determine the percentage of moisture removed in accordance with the teachings of the present invention whereby the advantage of the present invention was demonstrated.

It has been further found in accordance with the teachings of the present invention, and with regard to the removal of moisture containing material having cellular structure, that the differential roll speeds and applied rolling loads develop shearing action which rupture the cellular structure and removes bound moisture contained therein.

Still further, it will be understood that it is within the teachings of the present invention to provide a plurality of the apparatus 10 of FIG. 1 in tandem whereby the moisture removal process described above may be repeated for further moisture removal and whereby increasingly larger rolling loads may be applied to the material successively and/or higher differential speeds may be applied to the successive rolls as the material is passed therebetween to create successively greater friction and successively greater temperatures.

It was discovered that were the rolls 12 and 14 to be operated at the same speeds, the removed moisture will be pushed back into the roll gap and interfere with the feeding of the material to the rolls. Also, it was discovered that such removed moisture will propogate to the outer edge of the impacted material where it may be reabsorbed by the compacted material. However, as taught above, by providing the rolls with differential speeds, the material passed therebetween will be advanced into the roll gap more readily and the friction will be developed by the slippage between the rolls due to the differential speeds.

Referring again to the TABLES, it will be noted that wood chips may be provided having moisture content well below the 30% referred to in the above-noted article by Haygreen which wood chips are readily usable for boiler fuel. And, referring particularly to TABLES II and III, it will be noticed in accordance with the teachings of the present invention that while vegetable biomass such as peat is difficult to advance between the rolls, by providing a mixture of peat and a carrier material such as soft maple wood chips in various proportions, such as the 50%-50% proportions noted in the TABLES, the vegetable biomass and soft maple wood chips mixture will be readily advanced through the rolls to reduce the moisture content of the peat. Similarly, and referring to TABLE II, soft maple wood chips as a carrier may be added to animal waste, such as cow manure, to readily advance the cow manure through the rolls for moisture removal—without the addition of the carrier material, it has been found that the advancement of animal wastes through the rolls can be undesirably difficult.

It will be understood by those skilled in the art that the examples given in TABLES I-V are merely illustrative but that when such illustrations are taken in combination with the teachings set forth above, and as illustrated in FIG. 1, rolling mills of different sizes may be used to remove moisture from moisture containg materials by up-scaling such rolling mills in accordance with well-known formulas, and it is recognized that upon the present invention being practiced by rolling mills of larger size, different rolling loads will be applied to the material and different temperatures will be developed in the rolls, all in accordance with the teachings of the present invention.

It has been further found that the apparatus and processes of the present invention for reducing the moisture content of the noted materials has a further advantage in that the materials upon passing through the rolls 12 and 14 are provided with a decreased particle size whereby increased surface area is provided which enhances any subsequent further drying required or desired.

Additionally, the apparatus and process of the present invention may be advantageously utilized to destructure wood biomass and vegetable biomass in pulping and paper processes. Upon the biomasses being provided with increased particle sizes, greater exposed surface areas are provided which facilitate and shorten the digestion time and reduce the amount of chemicals required for the pulping process. Similarly, the increased exposed surface area provided is also advantageous in the making of methanol from wood biomass and ethanol from vegetable biomass as the increased exposed surface area also shortens the reaction time of the chemical reaction.

Referring again to FIG. 1, it will be understood that instead of using the mechanical wipers indicated diagrammatically by reference numerals 40 and 44, in the alternative other moisture and compressed material removal means may be used such as, for example, suitable vacuum means of the type known to those skilled in the art.

With further regard to the above teachings of use of soft maple wood chips as a carrier for advancing peat and animal biomass such as manure through the rolls, it has been further found that sawdust and shredded paper may be substituted for soft maple wood chips.

Referring again to FIG. 1, it will be understood in accordance with the further teachings of the present invention that in the preferred embodiment the slower rotating roll is the bottom roll 14 and the faster rotating roll is the upper roll 12 to cause the removed moisture to adhere to the upper roll and thereby to prevent the moisture removed from the upper roll 12 by the wiper 44 from falling into the compressed material 36.

Figure 2:
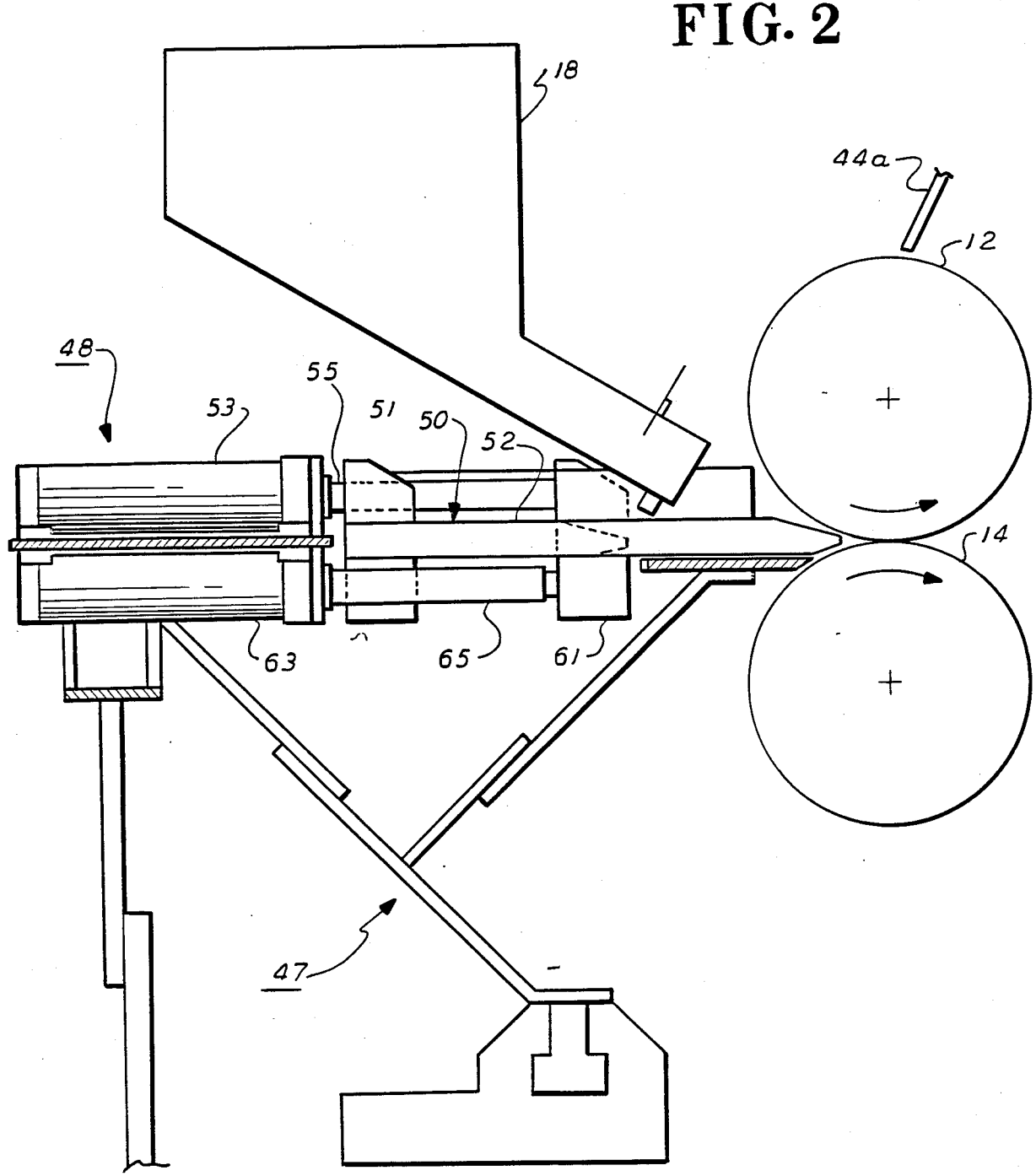
FIG. 2 is a side elevational view of alternate apparatus embodying the present invention and including feed finger apparatus for facilitating advancement of moisture containing material between the rolls and which alternate apparatus also are useful for practicing the process of the present invention.
Figure 3:
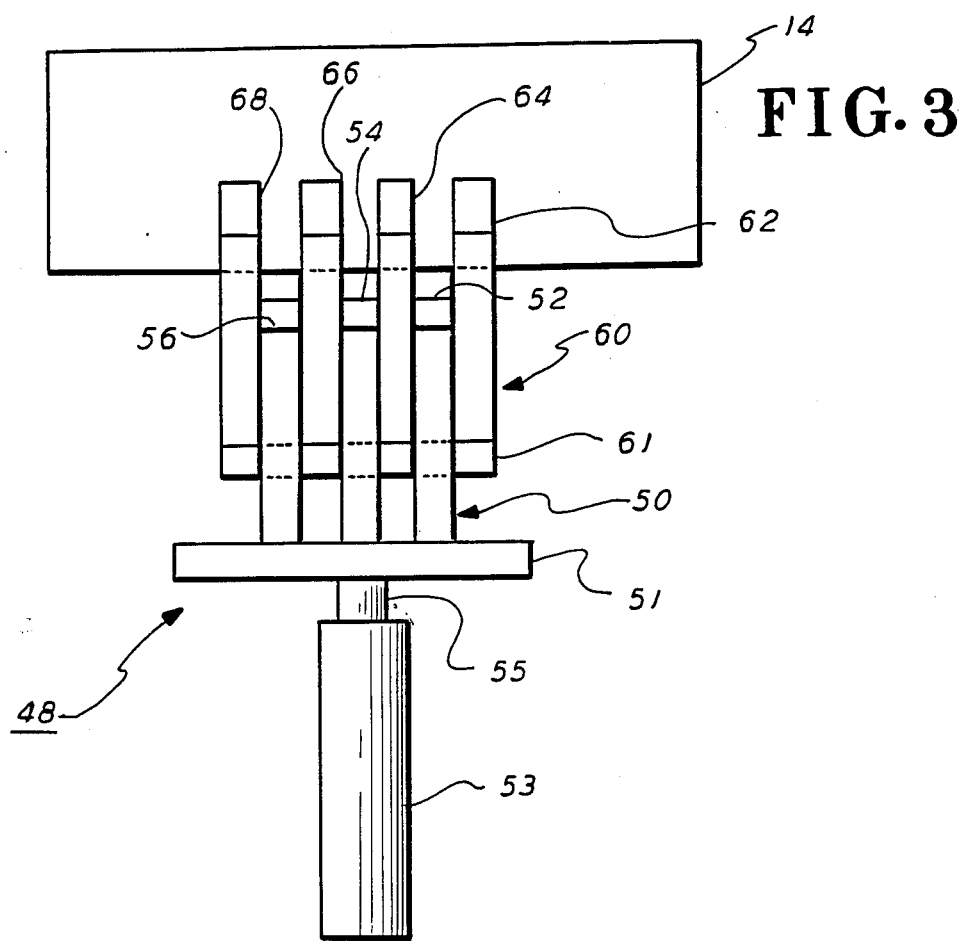
FIG. 3 is a top plan view of the apparatus of FIG. 2 but with the hopper and upper roll removed for convenience and clarity of presentation.

Referring now to FIGS. 2 and 3, there is shown a further alternate embodiment of apparatus embodying the present invention and in which figures structure identical to that shown in FIG. 1 is numbered identically.

In this alternate embodiment, feed finger apparatus indicated by general numerical designation 48 are included to facilitate advancement of the moisture containing material, flowing from the hopper 18, between the rolls 12 and 14. As may be best seen in FIG. 2, the feed finger apparatus 48 is mounted adjacent the input of the rolls by being supported or mounted on suitable support structure or brackets indicated by general numerical designation 47. Feed finger apparatus 48 includes pluralities of sets of interleaved feed fingers indicated, respectively, by general numerical designations 50 and 60. Set of feed fingers 50 includes individual feed fingers 52, 54 and 56 mounted at their rearward ends on a common bar 51 in turn mounted on a rod 55 mounted reciprocably in a suitable hydraulic piston 53. Set of feed fingers 60 includes individual feed fingers 62, 64, 66, and 68 mounted at their rear ends on common bar 61 in turn mounted on piston 65 mounted reciprocably in a suitable hydraulic piston 63.

It will be understood from FIGS. 2 and 3 that the sets of feed fingers 50 and 60 are interleaved and reside in a common horizontal plane. It will be further understood that the hydraulic cylinders 53 and 63 are operated by suitable control means of the type known to those skilled in the art to impart alternating reciprocating linear movement to the sets of interleaved feed fingers to facilitate advancement of the moisture containing material, flowing from the hopper 18, between the rolls 12 and 14.

Referring again to FIG. 2, it will be noted that in this alternate embodiment the upper wiper 44a associated with the faster rotating upper roll 12 is mounted at substantially the top of the roll 12 to increase the amount of time the compressed material adheres to the lower roll to increase the amount of time the compressed material adheres to the roll 12 to enhance removal by the heat generated by the above-noted friction of any moisture remaining in the compressed material after rolling and to cause any additional moisture scraped off by the upper wiper 44a to flow down substantially one half of the periphery of the top roll 12 to cause such additional removed moisture to be evaporated by the heat.

Figure 4:
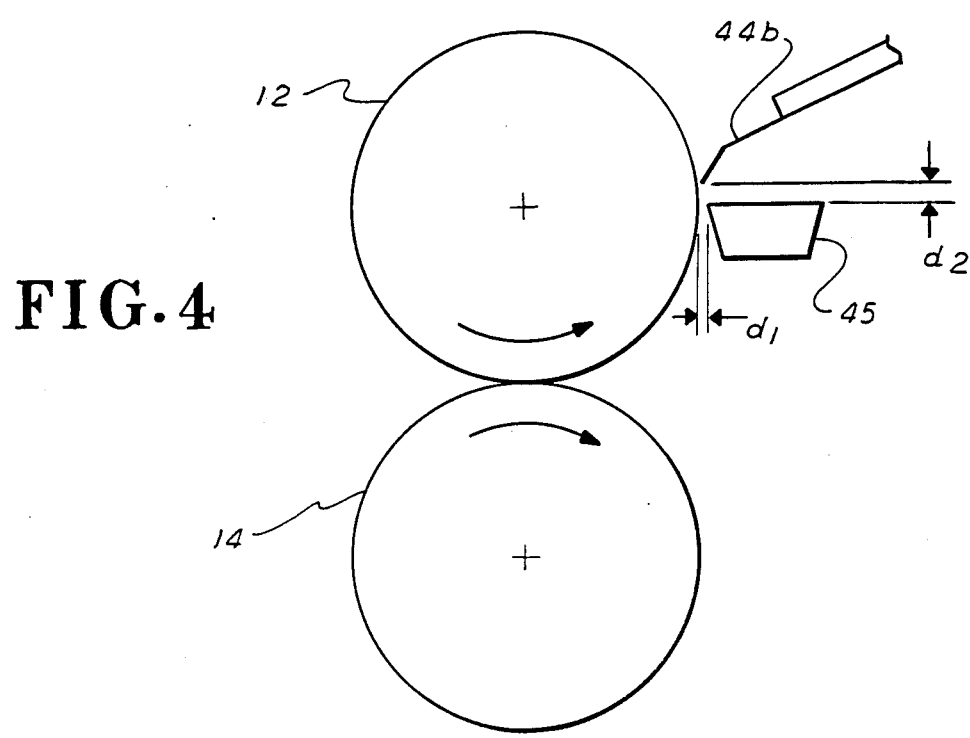
FIG. 4 is a side elevational view of further alternate apparatus embodying the present invention.

Referring now to FIG. 4, there is shown a further alternate embodiment of the present invention wherein the top roll 12 is the faster rotating roll and the lower roll 14 is the slower rotating roll whereby the compressed material will adhere to the lower slower rotating roll 14. In this embodiment, and a tray 45 is included to catch any moisture remaining in the compressed material adhering to the roll 12 and which moisture is removed by the wiper 44b. It will be noted, in accordance with the further teachings of the invention and as illustrated in FIG. 4, the tray 45, being suitably mounted by means not shown, is positioned a predetermined distance $d_1$ outwardly from the roll 12 to permit compressed material adhering to the roll 12 to pass between the tray 45 and the roller 12 and that the tray 45 is positioned a predetermined distance $d_2$ downwardly from the wiper 44b to enhance the falling into the tray 45 of any moisture removed by the wiper 44b; in one embodiment, $d_1$ was approximately ⅛ inch and $d_2$ was approximately ¼–⅜ inch.

Referring now to FIG. 5, there is illustrated diagrammatically a biodigester embodying the present invention and indicated by general numerical designation 100. Generally, the biodigester 100 is for receiving organic material, such as for example animal biomass, e.g. cow manure and the like, and is for decomposing or composting the material by bacterial action or by the action of aerobic microorganisms in the presence of oxygen, into, for example in the case of animal biomass, organic fertilizer or organic soil conditioner which is sterile, odor free and weed free.

The biodigester 100 may include a container or vessel 110 provided with a suitable intake 112 adapted to receive organic material such as the above-noted biomass and a suitable output 114 to discharge the decomposed organic material. As may be noted from FIGS. 5 and 6, the container 110 may comprise two up-standing side walls, a top and bottom, and opposed ends to laterally contain the organic material such as the animal biomass and may be provided with conveyor means, such as a first plurality of laterally disposed screw conveyors 116 (FIGS. 5 and 6) mounted adjacent the bottom of the container 110 and a second plurality of laterally disposed screw conveyors 118 mounted adjacent the top of the container 110 for advancing the organic material through the biodigester 110 continuously or intermittently as taught below. In addition, the biodigester 100 may be provided with a plurality of laterally disposed air tubes 120 mounted adjacent the bottom of the container 110 below the first plurality of screw conveyors 116 for introducing an oxygen containing medium such as air into the container 110 to facilitate the above-noted decomposition; such air being introduced into the air tubes by a suitable blower 122. Further, the biodigester 100 may be provided with a suitable air vent 128 for venting the container 110 to reduce the temperature of the organic material such as the above-noted animal biomass being decomposed in the biodigester 100 upon the temperature of such decomposing material exceeding the predetermined limit as taught below. In addition, the vent 128 is for being closed to cause the temperature within the container 110 to rise and facilitate decomposition as is also taught below.

Referring again particularly to FIG. 5, it will be understood that in accordance with the further teachings of the present invention the biodigester 100 may be provided with suitable control means including a suitable microprocessor 130, which may be any one of several commercially available such microprocessors, and a plurality of sensors, such as thermal sensors $S_1 \ldots S_n$ disposed longitudinally, and suitably mounted within the mass, internally of the vessel or container 110. The microprocessor 130 may be suitably interconnected with a motor 132, such as a suitable hydraulic or pneumatic motor for operating the pluralities of screw conveyors 116 and 118, with the blower 122 for blowing or feeding air into the plurality of air tubes 120; and with the air vent 128 which may be a suitable motor operated air vent.

An example of operation of the biodigester 100 will now be set forth in the context of biodigesting, composting or decomposing dairy cow manure, but it will be understood that the present invention is not so limited and that such example is merely illustrative of the present invention and that other organic materials noted above may be decomposed or digested in the biodigester 100. It will be understood that, in accordance with the present example, the microprocessor 110 will be suitably programmed in accordance with predetermined parameters, such as thermal parameters, for decomposing the dairy cow manure during a five day period as the manure is advanced through the vessel 110 by the pluralities of screw conveyors 116 and 118. Further, it will be understood that the microprocessor 130 has been programmed with such thermal parameters to maintain the temperature within the container 110 in the thermophyllic range of approximately 135° F.–180° F. and preferably approximately 147° F. during decomposition. It will be further understood by those skilled in the art that the specific programming and the specific computer language used are not part of the present invention and that upon understanding the invention as set forth herein, such programming may be accomplished by one of ordinary skill in the art. In accordance with the example of the present invention, fresh dairy cow manure is introduced into the vessel 110 through the intake 112, the intake and air vent 128 closed, and the microprocessor 130 turned on. Natural decomposition will occur through the well known bacterial action or action of aerobic microorganisms in the presence of oxygen causing decomposition or composting of the manure with an attendant rise in temperature so long as the aerobic bacteria or microorganisms have sufficient oxygen. The thermal sensors $S_1 \ldots S_n$ will sense the temperature of the various portions of the dairy cow manure distributed along the length of the container 110 and, upon the temperature within the container rising above the above-noted thermophyllic range, the thermal sensors will provide a suitable signal to the microprocessor which will operate the motor driven air vent 128 to open the vent and vent the interior of the vessel or container 110 to the atmosphere thereby lowering the temperature within the container. Upon the temperature within the container falling below the above-noted thermophyllic range due, for example, to reduced or even halted decomposition activity between the aerobic bacteria or microorganisms which are oxygen short or deprived, the thermal sensors will provide a suitable signal to the microprocessor which will cause the microprocessor to close the motor driven air intake 128 permitting the temperature within the vessel to again rise due to decomposition activity and in this manner the temperature within the vessel is maintained within the above-noted desired range. In addition, the microprocessor will be suitably programmed with parameters for operating the screw conveyors 116 and 118 in accordance, for example, with the thermal conditions sensed by the sensors $S_1 \ldots S_n$ and, in the embodiment illustrated, upon the temperature of the decomposing cow manure within the biodigester 100 being maintained within the above-noted range, the microprocessor, for example, will advance the decomposed dairy cow manure through the biodigester in five days, as illustrated diagrammatically in FIG. 7, by appropriately operating and/or not operating the screw conveyors 116 and 118 under the control of the microprocessor.

Figure 7:
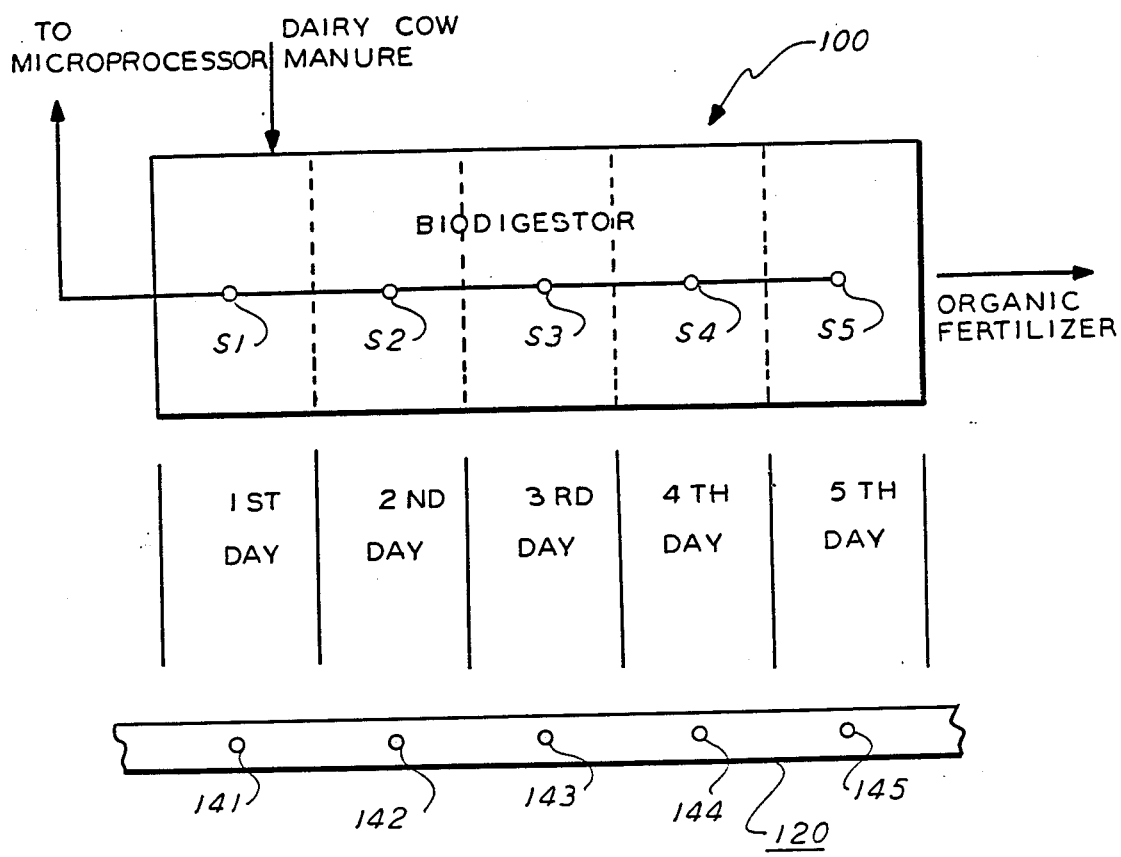
FIG. 7 is a diagrammatical illustration of an alternate embodiment of the present invention upon the biodigester of FIG. 6 being provided with the air tube(s) illustrated diagrammatically in FIG. 7.

It will be further understood that in accordance with the teachings of the present invention the operation of the biodigester 100 may be continuous, or substantially continuous, and that upon the biodigester 100 being filled with, for example, dairy cow manure as described above and operated as noted above, the biodigester will decompose such dairy cow manure within, for example, five days and at the end of each five days period a predetermined quantity, e.g. one-fifth (20%), of the decomposed dairy cow manure contained within the biodigester 100 will be discharged at the output 114 of the biodigester 100 whereupon another replacement quantity, e.g. one-fifth (20%) of the capacity of the biodigester of dairy cow manure will be introduced into the intake 112 and the cow manure will be continuously, or at least substantially continuously, operated for decomposition; this five days procedure is illustrated diagrammatically in FIG. 7. Further, upon the temperature of the animal biomass rising above the noted range, and upon the microprocessor 130 receiving the signal from the sensors $S_1 \ldots S_n$ to open the vent 128, the microprocessor may turn off the blower 122 to halt oxygen supply to the bacteria or microorganisms to reduce or even halt decomposition to additionally control the temperature of the decomposing diary manure or animal biomass;o upon the temperature falling below the noted range and the microprocessor 130 receiving the signal from the sensors $S_1 \ldots S_n$ to close the vent 128, the microprocessor may turn on the blower 122 to supply oxygen to the bacteria or microorganisms to recommence or accelerate decomposition and additionally control the temperature of the decomposing animal biomass.

Further, the microprocessor may be programmed in accordance with established parameters to accomplish the decomposition in five days by maintaining the temperature of the decomposing dairy manure or animal biomass in the noted range by supplying oxygen to the decomposing manure in accordance with a predetermined procedure, e.g. by operating the blower 122 to introduce oxygen, for example at 100 cubic feet per minute at a static pressure of 10 pounds at 5 minutes per hour, or 2½ minutes per half hour, or 1¼ minute per 15 minutes.

In summary, oxygen supplied to the decomposing dairy cow manure, maintenance of decomposing manure in a determined temperature range, and the volume of movement of the manure through the biodigester 100 may be accomplished under the control of the microprocessor in accordance with the teachings of the present invention.

It will be understood in accordance with the further teachings of the present invention that the oxygen carrying medium, such as air, introduced into the air tubes/plenum 120 may include certain enzymes, or various airborne spores, to accelerate decomposition of the organic material, such as animal biomass, e.g. manure within the biodigester 100.

In addition, as will be understood by those skilled in the art, dairy cow manure upon being deposited by dairy cows has a typical moisture content of 70%-85% by weight. It has been found that the efficiency of the biodigester 100 may be enhanced by reducing the moisture content of the dairy cow manure prior to introduction into the biodigester and in particular by reducing the moisture content of such dairy cow manure to approximately 55% by weight.

Further, as is also known, dairy cow manure has nitrogen content and decomposition of the manure will convert the nitrogen into ammonia producing offensive odors which is undesirable and, since nitrogen and its compounds have value, the nitrogen can be undesirably lost in the decomposition or biodigestive process; it is desirable, therefore, to fix the nitrogen and prevent its conversion into ammonia. In accordance with the further teachings of this invention, this reduction in moisture content and fixing of the nitrogen may be accomplished by mixing carbon with the dairy cow manure, such as for example in a suitable paddle mixer, in accordance with the well known relationship that approximately 35% by weight of carbon having 18%-19% moisture content will absorb approximately 65% by weight of nitrogen. Using this relationship, and by mixing carbon with the cow manure, the moisture content by weight of the cow manure may be reduced approximately 55% by weight and the nitrogen fixed.

Referring again to FIG. 5, and now specifically to the structure of an embodiment of the container 110 of the biodigester 100 of the present invention, it will be noted that the container may be provided with an outer shell of suitable protective material such as metal, or of suitable plastic, an intermediate layer of suitable insulation, and an inner shell which may be of a suitable material such as carbon steel, stainless steel, fiberglass or the like. Further, the biodigester 100 may be mounted stationarily or may be portable by being mounted on skids 150 to facilitate movement from one location to another; alternatively, the biodigester 110 can be mounted on suitable wheels for such portable operation.

Figure 8:
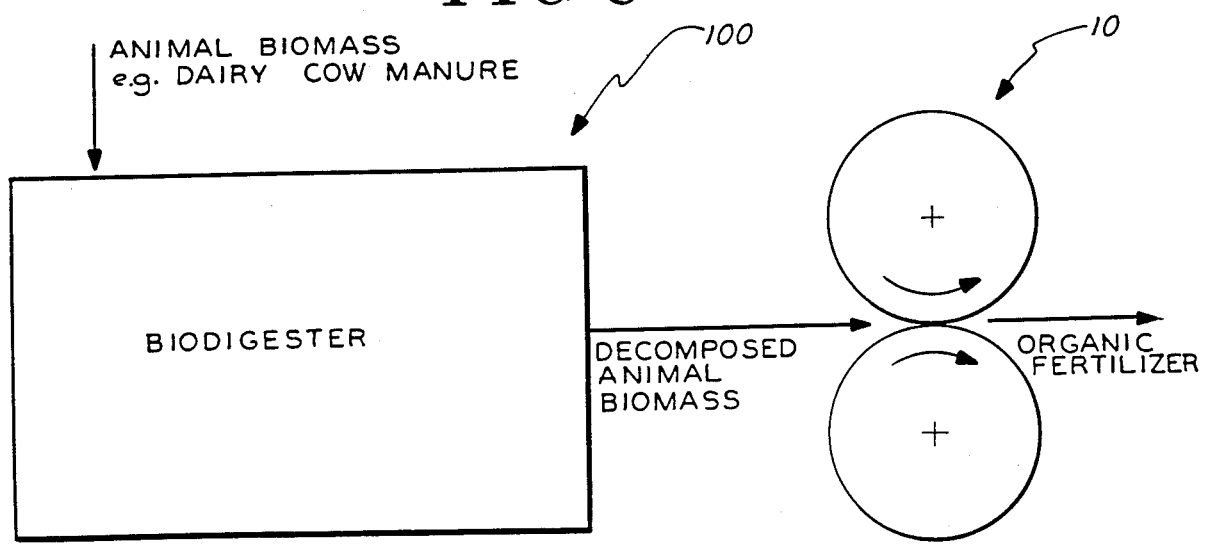
FIG. 8 is a diagrammatical illustration of apparatus and process of the present invention.

It has been discovered, in accordance with the further teachings of the present invention, that the decomposition, composting or biodigesting apparatus and process taught hereinabove may be novelly combined with the apparatus and processes for compressive rolling to reduce the moisture content of moisture containing material as also taught hereinabove. This novel combination is illustrated diagrammatically in FIG. 8. In FIG. 8 it will be understood in accordance with the further combination invention that, for example, animal biomass such as dairy cow manure may be introduced into the biodigester 100 and decomposed as taught hereinabove and the decomposed animal biomass output may be introduced into the hopper 18 (FIG. 1) of the compressive rolling apparatus 10 for compressing rolling to further reduce the moisture content of the dairy cow manure. In one embodiment, dairy cow manure is decomposed in the biodigester 100 and such dairy cow manure, as taught hereinabove, has an input moisture content by weight of approximately 72-71% and has the same moisture content by weight after decomposition. But, it has been discovered that upon introducing such decomposed animal biomass, e.g. dairy cow manure, into the hopper 18 of the rolling apparatus 10, the moisture content may be reduced to approximately 30% providing suitable organic fertilizer or soil conditioner. Further, if desired and as also taught hereinabove, the moisture content of the decomposed animal biomass may be further reduced during compressive rolling by mixing wood chips or saw dust with the decomposed animal biomass and upon so doing the moisture content of the compressively rolled decomposed animal biomass may be reduced 17-15% moisture content by weight. Further, it will be understood that the combined invention illustrated diagrammatically in FIG. 8 is not restricted to the processing of animal biomass but may also be used advantageously to process other materials noted hereinabove.

The biodigester of the present invention, by decomposing manure found on the typical farm, functions as a new innovative environmental control apparatus to improve the environment of the farms.

It will be understood by those skilled in the art that many variations and combinations may be made in the present invention without departing from the spirit and the scope thereof.

What is claimed is:

1. Process for producing organic fertilizer or soil conditioner from moisture containing animal biomass by decomposing animal biomass by the action of aerobic microorganisms in the presence of oxygen and by compressing such decomposed animal biomass, comprising:

introducing said animal biomass into container means having an end adapted to receive said animal biomass and an output end adapted to discharge decomposed animal biomass;

introducing a medium containing oxygen into said container to facilitate said decomposition of said animal biomass by action of said microorganisms;

advancing said animal biomass through said container means and upon decomposition of said animal biomass discharging said decomposed animal biomass out of said output end of said container means;

mixing predetermined proportions of said decomposed animal biomass and a predetermined carrier material chosen from a group consisting of sawdust, shredded paper or wood chips to enhance the advancement of said decomposed animal biomass between said pair of opposed rolls, said predetermined proportions being approximately 50% of each;

advancing said mixed decomposed animal biomass and predetermined carrier material between said pair of opposed rolls to apply predetermined rolling load thereto to compress said decomposed animal biomass and remove at least a portion of said moisture therefrom; and causing one of said rolls to rotate at a predetermined lower speed than the rolling speed of the other of said rolls to develop friction between the rolls causing said rolls to be heated and apply heat to said decomposed animal biomass to further remove moisture therefrom, to cause said compressed decomposed animal biomass to adhere to one roll to cause said removed moisture to adhere to said other roll.

2. Process according to claim 1 wherein different amounts of air are introduced into different predetermined portions of said animal biomass as said animal biomass is introduced through said digester by said conveyor means.

3. Process according to claim 2 wherein said process further includes the steps of sensing the thermal conditions of predetermined portions of said animal biomass as said animal biomass is advanced through said container means and controlling the quantities of said medium introduced into predetermined portions of said animal biomass in accordance with a predetermined program and controlling the rate of advancement of said animal biomass through said container means in accordance with said sensed thermal conditions.

4. Process according to claim 1 wherein said rolling load is approximately 27,000 pounds.

5. Process according to claim 4 wherein said heat is approximately 400° F.

6. Process according to claim 1 wherein said process includes the further step of, prior to introducing said animal biomass into container means, fixing the nitrogen content of said animal biomass and reducing the moisture content of the animal biomass to the thermophyllic range of approximately 55% moisture by weight, mixing carbon having 18%–19% moisture content with said animal biomass 35% by weight of carbon will absorb approximately 65% by weight of nitrogen.

7. Process according to claim 1 wherein said process includes the further step of including in said medium containing oxygen a predetermined accelerator to accelerate decomposition of said animal biomass.

8. Process according to claim 7 wherein said predetermined accelerator is chosen from a group consisting of a predetermined enzyme or predetermined airborne spore.

* * * * *